United States Patent
Saleh et al.

(10) Patent No.: US 11,188,917 B2
(45) Date of Patent: Nov. 30, 2021

(54) SYSTEMS AND METHODS FOR COMPRESSING BEHAVIOR DATA USING SEMI-PARAMETRIC OR NON-PARAMETRIC MODELS

(71) Applicant: PAYPAL, INC., San Jose, CA (US)

(72) Inventors: Moein Saleh, San Jose, CA (US); Xing Ji, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 67 days.

(21) Appl. No.: 15/940,930

(22) Filed: Mar. 29, 2018

(65) Prior Publication Data

US 2019/0303941 A1    Oct. 3, 2019

(51) Int. Cl.
G06Q 20/40        (2012.01)
G06F 21/31        (2013.01)
G06N 20/00        (2019.01)

(52) U.S. Cl.
CPC ....... *G06Q 20/4016* (2013.01); *G06F 21/316* (2013.01); *G06N 20/00* (2019.01)

(58) Field of Classification Search
CPC ........ G06N 20/00; G06N 7/005; G06N 10/00; G06N 5/022; G06F 17/18; G06F 21/55; G06F 16/285; G06F 16/9024; G06F 16/2255; G06F 16/2365; G06F 16/904; G06Q 30/0202; G06Q 10/04; G06Q 10/06315; G06Q 10/10; G06Q 10/06; G06Q 10/0631; G06Q 10/1093; G06Q 30/0201; G06K 9/00536; G06K 9/628; G06K 9/6284; G06T 11/001; G06T 11/206; H04L 63/1425

USPC ..... 705/7.31, 14.58; 707/700, 737; 713/100; 703/2; 706/12, 52; 345/440, 442
See application file for complete search history.

(56) References Cited

U.S. PATENT DOCUMENTS

| | | | |
|---|---|---|---|
| 2002/0077792 A1 | 6/2002 | Qui | |
| 2008/0162205 A1* | 7/2008 | Gross | G06F 16/904 345/440 |
| 2008/0162207 A1* | 7/2008 | Gross | G06F 8/35 703/2 |

(Continued)

OTHER PUBLICATIONS

"Parametric and Non-Parametric Machine Learning Algorithms", by Jason Brownlee, published on Mar. 14, 2016, 16 pages.*

(Continued)

*Primary Examiner* — Alexander G Kalinowski
*Assistant Examiner* — Sanjeev Malhotra
(74) *Attorney, Agent, or Firm* — Haynes and Boone, LLP (57) ABSTRACT

Methods and systems for efficiently compressing information comprising a plurality of data points along a particular dimension are presented. In some embodiments, a model may be generated using a semi-parametric modeling technique or a non-parametric modeling technique to represent the plurality of data points. The model may include a set of parameters that is less in size than the plurality of data points. Once the model is generated, the set of parameters may be stored and subsequently used to represent the information, with a significant reduction in storage space over the original data. In response to a request to analyze the information, the set of parameters may be analyzed to produce an outcome. Since the set of parameters have less cardinality than the plurality of data points in the original information, the efficiency of the analysis tool is enhanced.

20 Claims, 7 Drawing Sheets

(56) References Cited

U.S. PATENT DOCUMENTS

| | | | |
|---|---|---|---|
| 2009/0077093 A1* | 3/2009 | Sarma | G06F 16/217 |
| 2009/0132446 A1 | 5/2009 | Milenova et al. | |
| 2009/0228430 A1 | 9/2009 | Berger et al. | |
| 2011/0246306 A1* | 10/2011 | Blackhurst | G06Q 30/0267 |
| | | | 705/14.58 |
| 2013/0124448 A1* | 5/2013 | Soulie-Fogelman | G06Q 50/01 |
| | | | 706/52 |
| 2014/0122173 A1* | 5/2014 | Wang | G06Q 30/0202 |
| | | | 705/7.31 |
| 2014/0164059 A1* | 6/2014 | Dove | G06Q 30/0202 |
| | | | 705/7.31 |
| 2015/0160953 A1* | 6/2015 | Kienle | G06F 11/3409 |
| | | | 713/100 |
| 2015/0269178 A1* | 9/2015 | Rhodes | G06F 16/958 |
| | | | 707/700 |
| 2015/0325016 A1* | 11/2015 | Carr | G06T 11/20 |
| | | | 345/442 |
| 2016/0004765 A1* | 1/2016 | Tyercha | G06F 16/2228 |
| | | | 707/737 |
| 2016/0055427 A1* | 2/2016 | Adjaoute | G06Q 30/0201 |
| | | | 706/12 |
| 2016/0171380 A1* | 6/2016 | Kennel | G06N 7/005 |
| | | | 706/12 |
| 2016/0299938 A1* | 10/2016 | Malhotra | G06K 9/6284 |
| 2017/0032274 A1* | 2/2017 | Yu | G06N 20/00 |
| 2017/0060769 A1* | 3/2017 | Wires | H04L 12/6418 |
| 2017/0083753 A1* | 3/2017 | Friedland | G06K 9/00973 |
| 2017/0116159 A1* | 4/2017 | Hamze | G06N 10/00 |
| 2017/0223036 A1* | 8/2017 | Muddu | G06F 16/9024 |
| 2017/0249376 A1* | 8/2017 | Garvey | G06Q 30/0201 |
| 2017/0249563 A1* | 8/2017 | Garvey | G06N 20/00 |
| 2017/0249564 A1* | 8/2017 | Garvey | G06Q 10/0631 |
| 2017/0249648 A1* | 8/2017 | Garvey | G06T 11/001 |
| 2017/0249763 A1* | 8/2017 | Garvey | G06F 17/18 |
| 2017/0255871 A1* | 9/2017 | Macready | G06N 7/005 |
| 2017/0300489 A1* | 10/2017 | Qin | G06F 16/2255 |
| 2017/0300528 A1* | 10/2017 | Qin | G06F 16/2255 |
| 2018/0082208 A1* | 3/2018 | Cormier | G06N 20/00 |

OTHER PUBLICATIONS

"Using the Elbow Method to Determine the Optimal Numbers of Clusters for k-means Clustering", by Robert Gove, 6 pages, last Updated on Dec. 26, 2017.*

Chen et al., "Methods for nonparametric and semiparametric regressions with endogeneity: a gentle guide", Annual review of economics, Oct. 2015, 51 pages, [online] [Retrieved on May 31, 2019] <URL: https://pdfs.semanticscholar.org/d934/ff5be546e6eeda0e328af94e022d446a0519.pdf>.

* cited by examiner

SYSTEMS AND METHODS FOR COMPRESSING BEHAVIOR DATA USING SEMI-PARAMETRIC OR NON-PARAMETRIC MODELS

BACKGROUND

The present specification generally relates to compression of data, and more specifically to, compressing behavior data using semi-parametric models according to various embodiments.

RELATED ART

In today's electronic age, information related to human behavior is often collected and analyzed for a wide range of purposes such as authentication and data analysis. The information is usually collected over a period of time to generate statistical data (e.g., the number of times a user has been authenticated or performed a transaction over the period of time, etc.). In the example of using user behavior data for authentication, the data associated with a user account may be analyzed in real-time, for example by feeding the behavior data into a machine learning module, to determine whether the user account has been involved in unauthorized activities.

As the analytical tools for analyzing behavior data becomes increasingly sophisticated, larger amounts of behavior data are also required. However, processing large amounts of behavior data may cause a reduction in the performance of the analytical tools. Thus, there is a need for efficiently compressing behavior data while minimizing information loss.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for efficiently compressing information comprising a plurality of data points along a particular dimension. In some embodiments, a model may be generated using a semi-parametric modeling technique or a non-parametric modeling technique to represent the data points. The model may include a set of parameters that is less in size than the plurality of data points. Once the model is generated, the set of parameters may be stored and subsequently used to represent the information (e.g., rather than using the data points). For example, when the information represents electronic behavior of a user, a behavior analysis tool (e.g., a risk analysis algorithm) may use the parameters, instead of the plurality of data points, to analyze the behavior of the user. Since the parameters have less cardinality than the plurality of data points in the original information, the performance of the analysis tool is enhanced.

The information may include any type of data over a common dimension. An example dimension may be a time dimension. The plurality of data points may represent the points in time that a user performs a certain action, such as performing a login request, a payment transaction request, a fund withdrawal transaction, a web browsing action, etc. In another example, the plurality of data points may represent the daily balance of a user account for the past year. In yet another example, the dimension may be a geographical location dimension, and the plurality of data points may represent the number of times that a user has visited different geographical locations.

In some embodiments, a cardinality of the set of parameters used to represent the plurality of data points may be determined to optimize the compression while minimizing information loss. Different embodiments may use different techniques to determine the cardinality of the set of parameters. Under one approach, different cardinalities (that are fewer than the plurality of data points) may be used to generate a plurality of models to represent the data points. For example, a first model may be generated using one parameter, a second model may be generated using two parameters, a third model may be generated using three parameters, and so forth. A deviation of each generated model from the original information may be determined. An elbow technique may then be used to determine the optimal cardinality based on the cardinalities used to generate the model and their corresponding deviations from the original information or data.

In some embodiments, the data analysis tool may include a machine learning module such as an artificial neural network. The data analysis tool may be configured to analyze the information and produce an outcome. In these embodiments, instead of ingesting and analyzing the plurality of data points, the data analysis tool may ingest and analyze the set of parameters to produce the outcome. By using the set of parameters, instead of the plurality of data points, to represent the information, the computation performance of the data analysis tool may be improved.

Figure 1:
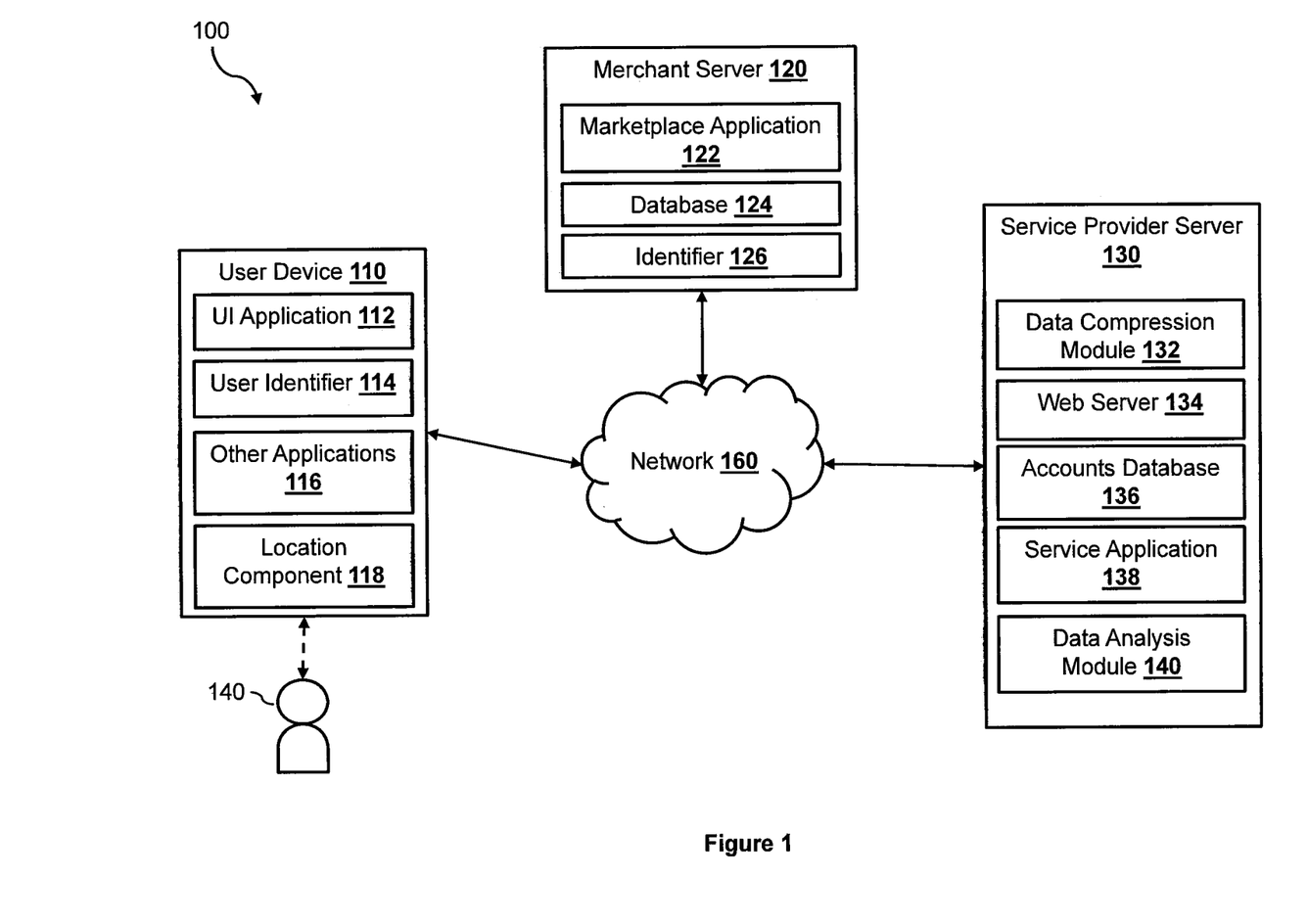
FIG. 1 is a block diagram illustrating an electronic transaction system according to an embodiment of the present disclosure.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to access account services or conduct electronic transactions (e.g., account transfers or payments) with the service provider server 130. Similarly, a merchant associated with the merchant server 120 may use the merchant server 120 to log in to a merchant account to access account services or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct transactions (e.g., shopping, purchasing, bidding, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of the user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., eBay® of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130 may also include a data analysis module 140. In some embodiments, the data analysis module 140 may ingest and analyze data that has been collected by the web server 134, the service application 138, and/or the accounts database 136, and produce an output. For example, the data analysis module 140 may be configured to perform risk analysis on various incoming transaction requests from the user device 110 or from the merchant server 120, and may determine to authorize or deny the incoming request based on information derived from the request and/or the data collected by the web server 134, the service application 138, and/or the accounts database 136.

The request may be a log-in request, a fund transfer request, a request for adding an additional funding source, or other types of requests associated with the variety of services offered by the service provider server 130. As such, when a new request is received at the service provider server 130 (e.g., by the web server 134), the data analysis module 140 may analyze (or evaluate) the request and determine whether the request is possibly an unauthorized/fraudulent request based on information available to the data analysis module 140. The data analysis module 140 may transmit an indication of whether the request is possibly an unauthorized/fraudulent request to the web server 134 and/or the service application 138 such that the web server 134 and/or the service application 138 may process (e.g., approve or deny) the request based on the indication.

In another example, the data analysis module 140 may be configured to determine a targeted marketing campaign for a customer associated with a specific user account based on the data collected by the web server 134, the service application 138, and/or the accounts database 136. Based on the customer's past online behavior monitored and/or obtained by the service provider server 130, the data analysis module 140 may determine a targeted marketing campaign (e.g., a purchase incentive from one or more merchants, an advertisement, etc.) for the customer.

In order to produce quality or more relevant output, the data analysis module 140 may require data that involves different aspects of the customer. As the ability to obtain the customer data grows, the volume of customer data also expands. The large volume of customer data not only requires memory space of the service provider server to store the customer data, it also requires more computational resources (e.g., processing and time) for the data analysis module 140 to analyze the customer data. For example, information about the daily balance of a user account related to the customer over the past year may include 365 data points (e.g., one data point per day for the past year), where each data point comprises the balance of the user account at the end of the corresponding day within the past year. As such, in various embodiments, the service provider server also includes a data compression module 132 that is configured to improve the performance of the data analysis module 140 by compressing the data for efficient processing using techniques disclosed herein. For example, the data compression module 132 may compress customer behavior data that has been compiled by the web server 134, the service application 138, and/or the accounts database 136.

By compressing the customer behavior data, the data compression module 132 enables the service provider server to use less memory space to store data that represents behavior of customers. Moreover, the compressed data may then be consumed by the data analysis module 140 in its compressed form to perform the necessary analyses. Since the compressed data in its compressed form (which includes less data than the information originally obtained by the service provider server 130) is used by the data analysis module 140, the performance of the data analysis module 140 can be improved.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the data compression module 132 and the data analysis module 140 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
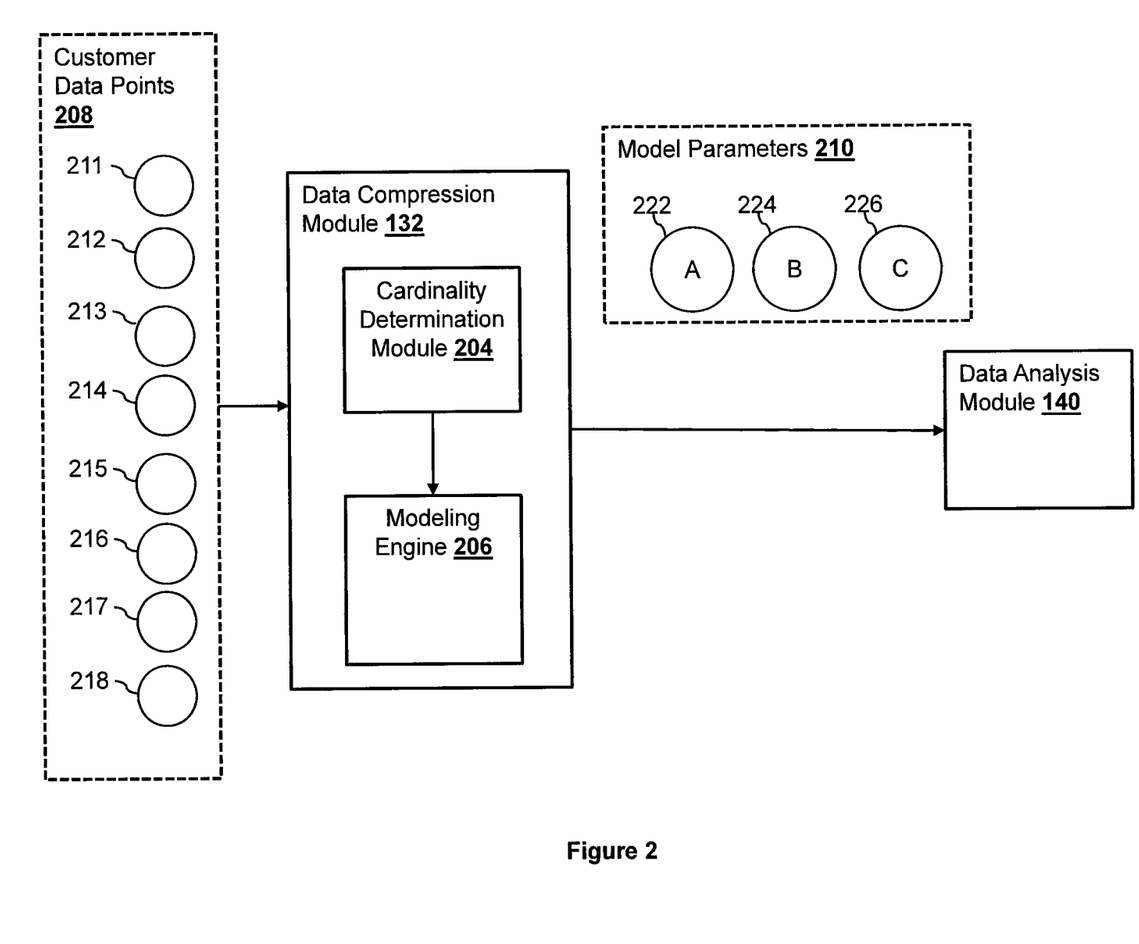
FIG. 2 is a block diagram illustrating a data compression module according to an embodiment of the present disclosure.

FIG. 2 illustrates a block diagram of a data compression module 132 according to an embodiment of the disclosure. The data compression module 132 includes a cardinality determination module 204 and a modeling engine 206. In some embodiments, the data compression module 132 compresses information represented by a plurality of data points 208 into a set of model parameters 210. As shown, the data points 208 in this example may include data points 212-218. The compression process performed by the data compression module 132 compresses the data points 211-218 into fewer parameters 210. In this example, the data compression module 132 compresses the eight data points 211-218 into three parameters 222-226. The data compression module 132 may then store the parameters 222-226 to represent the information, and in some embodiments, may delete the data points 211-218 from memory to free up memory space.

Furthermore, the data compression module 132 may also provide the data analysis module 140 access to the parameters 210. For example, upon receiving a request for the information from the data analysis module 140, the data compression module 132 may provide the data analysis module 140 the parameters 210, instead of the data points 208. The data analysis module 140 may use the parameters 210 for analyzing the information. For example, when the information corresponds to a daily balance of a user for the past year, the data analysis module 140 may analyze the daily balance of the user based on the parameters 210, and produce a corresponding outcome for the service provider server 130.

Figure 3:
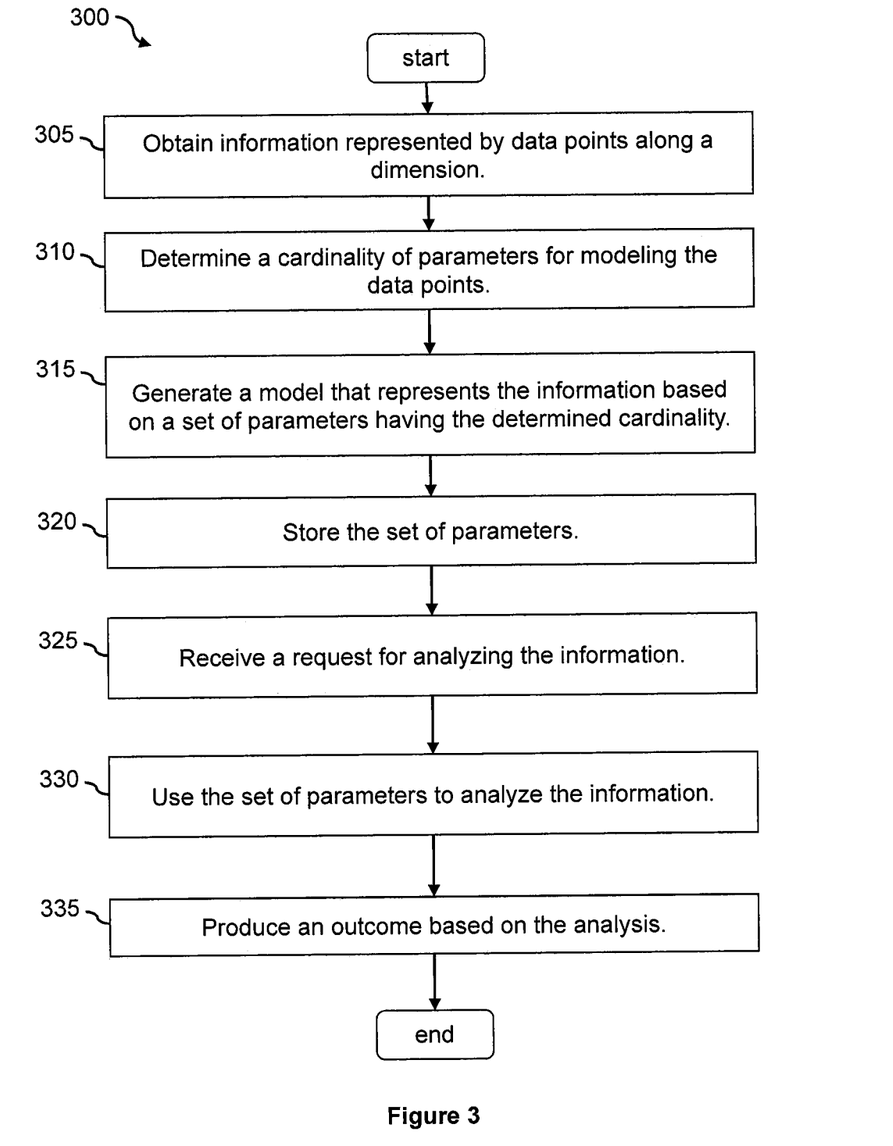
FIG. 3 is a flowchart showing a process of compressing information according to an embodiment of the present disclosure.

FIG. 3 illustrates a process 300 for compressing and processing information or data according to various embodiments of the disclosure. In some embodiments, the process 300 may be performed by the data compression module 132 and/or the data analysis module 140. The process 300 begins by obtaining (at step 305) information represented by multiple data points along a dimension. For example, the data compression module 132 may obtain the information from the web server 134, the accounts database 136, and/or the service application 138. The information may correspond to one or more aspects of a user. In an example where the dimension is a time dimension, the information may correspond to a user behavior along the time dimension, such as a daily balance of a user account over a period of time, a number of transaction requests (e.g., login requests, payment transaction requests, fund withdrawal requests, etc.) made daily over a period of time, etc. In another example where the dimension is a geographical dimension, the information may correspond to a number of times that a customer has visited different geographical locations in the past.

The information may be collected and/or obtained by the web server 134, the accounts database 136, and/or the service application 138. For example, the accounts database 136 may monitor and/or record the daily balance of accounts of various users, and store the data in a database associated with the service provider server 130. In another example, the web server 134 and/or the service application 138 may monitor and/or record the number of times (and the time) that a user performs a transaction (e.g., a login, a payment transaction, a fund withdrawal transaction, etc.) with the service provider server 130.

Figure 4:
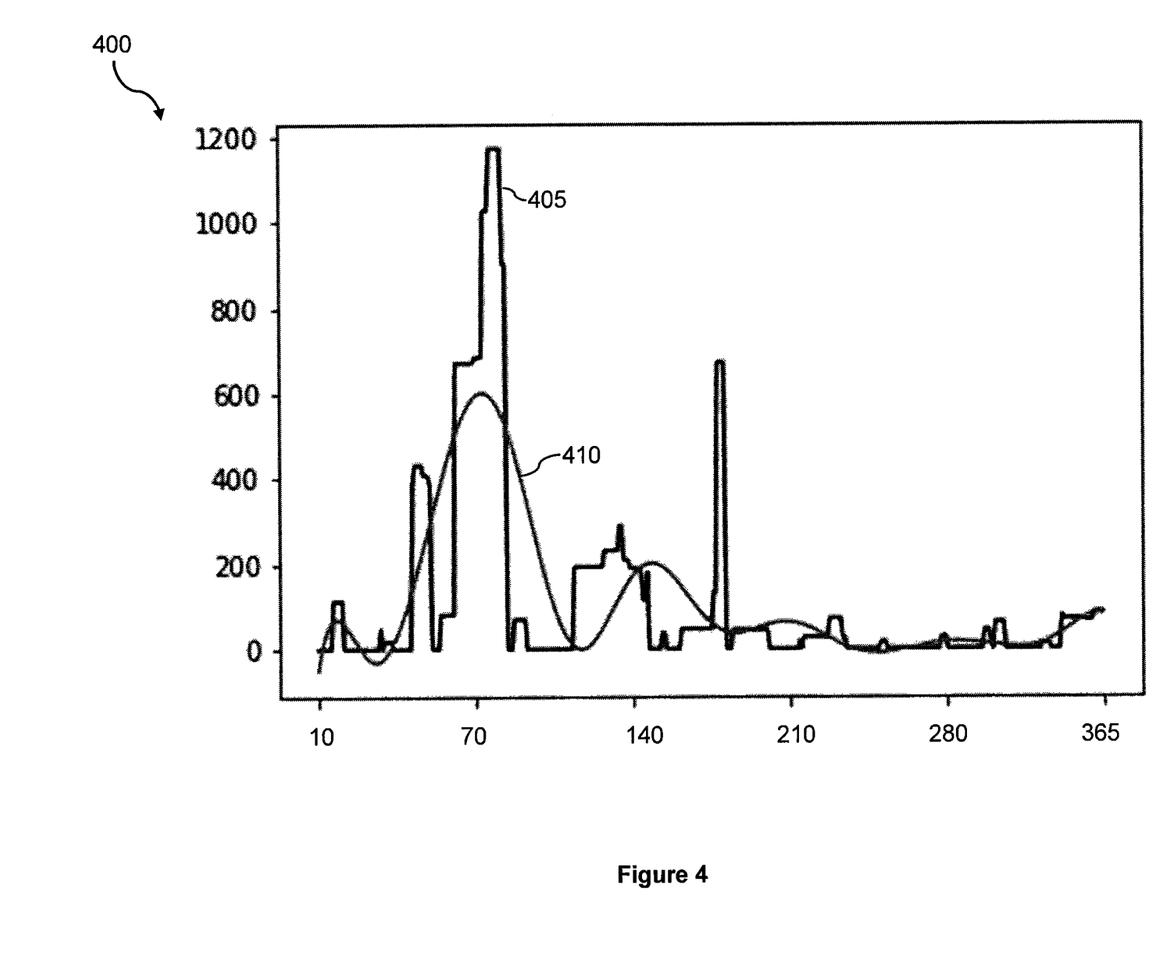
FIG. 4 illustrates a comparison between an original data set and the compressed data according to an embodiment of the present disclosure.

As discussed above, the information collected and/or obtained by the service provider server 130 may be voluminous. In an example that the information corresponds to a daily balance of a user over a year, the information may be represented by 365 data points, where each data point represents the daily balance value of a corresponding day within the year. FIG. 4 illustrates such daily balance information represented by the 365 data points in a graphical manner. In particular, FIG. 4 includes a graph 400 having a horizontal axis representing a timeline (e.g., the days within the year), and a vertical axis representing an amount in the user account. A line 405 may be generated by connecting the 365 data points. As shown by the line 405, in this example, the daily balance of the user account begins with 0 in day 0. The daily balance then fluctuates throughout the year and has a peak (the highest balance) of close to $1,200 soon after day 70. The daily balance also has a second highest balance of approximately $700 at around day 180. The daily balance then falls back down and ends with approximately $100 in day 365.

As such, the amount of data for storage and analysis can be very large, especially when a larger range along the dimension (over the past 10 years, etc.), and/or a finer granularity (e.g., hourly balance, etc.) is required or desired. Not only that the large amount of data requires a large memory storage, it also requires more computational resources (e.g., processing power and time) for analysis. As such, the data compression module 132 may compress the data points into fewer parameters for subsequent storage and analysis. In some embodiments, the data compression module 132 may compress the data points by using a semi-parametric model or a non-parametric model to model the information.

A semi-parametric model or a non-parametric model is a statistical model that can be represented by a mathematical function and a set of parameters. Examples of semi-parametric or non-parametric models include a B-Spline model, a C-Spline model, and a Wavelet. The mathematical function, along with the set of parameters, can be used to generate a smooth curve. The more parameters used by the model (e.g., higher cardinalities), the more flexible (e.g., more number of different crests and troughs) is the smooth curve. As such, a semi-parametric model or a non-parametric model (referred to herein generally as a "model") may be generated to model the data points along a dimension.

As shown in FIG. 4, a smooth curve 410 is generated based on a B-Spline model to model the data points represented by the line 405. In this example, the model that generates the smooth curve 410 includes 16 parameters, which is substantially reduced from the 365 data points. Even with such a substantial reduction of the cardinality for representing the daily balance information, as shown in FIG. 4, the smooth curve 410 tracks the line 405 quite well without losing much information.

Figure 5:
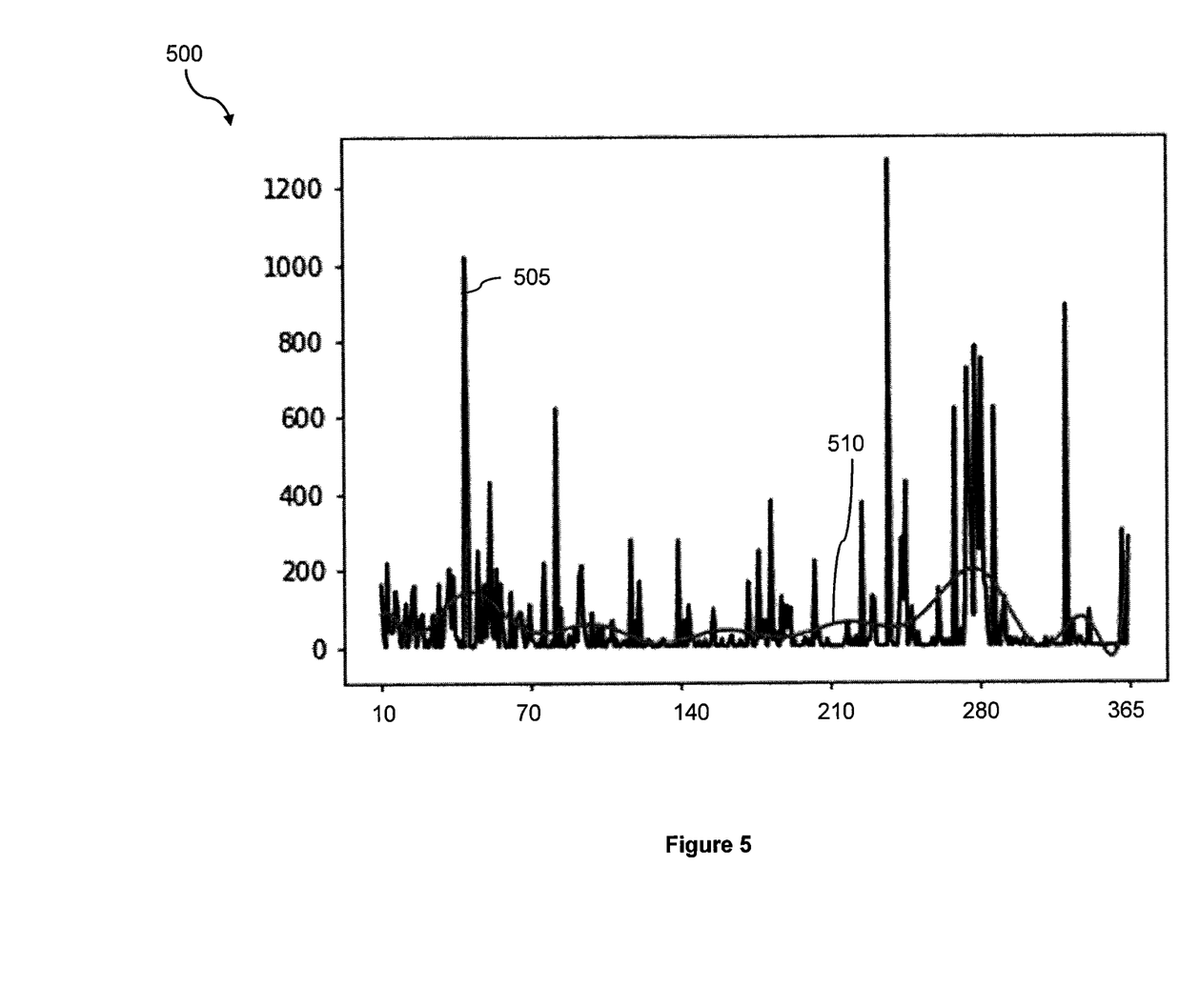
FIG. 5 illustrates a comparison between another original data set and the compressed data according to an embodiment of the present disclosure.

FIG. 5 illustrates information that corresponds to a daily balance of another user account in a graph 500 that is similar to the graph 400. The information also includes 365 data points representing the daily balance of the 365 days within a year. Similar to the graph 400, the graph 500 has a horizontal axis representing a timeline (e.g., the days within the year), and a vertical axis representing an amount in the user account. A line 505 may be generated by connecting the 365 data points. As shown by the line 505, in this example, the daily balance of the user account begins with approximately $160 in day 0. The daily balance then fluctuates throughout the year and has a peak (the highest balance) of close to $1,250 on day 235. The daily balance also has a second highest balance of approximately $1,050 at day 45. The daily balance also has a third highest balance of approximately $950 at day 330. The daily balance then falls back down and ends with approximately $280 in day 365.

FIG. 5 also shows a smooth curve 510 that is generated based on a B-Spline model to model the 365 data points represented by the line 505. In this example, the model that generates the smooth curve 510 includes 16 parameters, which is substantially reduced from the 365 data points. The mathematical function that is used to generate the smooth curve 510 can be expressed as:

$$Y(t)=84.57 \times B1(t)+126.40 \times B2(t)-159.30 \times B3(t)+458.96 \times B4(t)-212.48 \times B5(t)+225.75 \times B6(t)-128.59 \times B7(t)+154.87 \times B8(t)-93.93 \times B9(t)+207.49 \times B10(t)-183.81 \times B11(t)+700.88 \times B12(t)-590.73 \times B13(t)+519.79 \times B14(t)-315.01 \times B15(t)+236.19 \times B16(t) \quad (1)$$

where B1-B16 represents one or more mathematical functions, and t represents the time element.

As such, in this example, the 16 parameters include {84.57, 126.40, −159.30, 458.96, −212.48, 225.75, −128.59, 154.87, −93.93, 207.49, −183.81, 700.88, −590.73, 519.79, −315.01, and 236.19}. As shown in FIG. 5, even with such a substantial reduction of the cardinality for representing the daily balance information, the smooth curve 510 tracks the line 505 quite well without losing a lot of information.

As discussed above, the more parameters used in the model (e.g., higher cardinalities), the more accurate that the smooth curve generated by the model tracks the data points that represent the information. However, a balance needs to be struck between the desire to improve the accuracy to track the data points and the desire to compress the information. Thus, at step 310, the process 300 determines an optimal cardinality (e.g., the number of parameters) for modeling the data points. For example, the cardinality determination module 204 may be used to determine a cardinality for modeling a particular type of information.

In some embodiments, the cardinality determination module 204 determines a cardinality for modeling the particular type of information based on a deviation of a model from the actual data points. In this regard, the cardinality determination module 204 may compute a deviation for a model based on how much the model (generated using a particular number of parameters) deviates from the data points. In one embodiment, the deviation may be a sum of the differences between the data points and the corresponding values represented by the model. In another embodiment, the deviation may be computed using the sum of square of error (SSE) technique. In the example illustrated above by reference to FIG. 5, the cardinality determination module 204 may compute a difference between each of the 365 data points and the corresponding value (obtained from the model, or Equation (1), that generates the smooth curve 510). The deviation may then be computed using the sum of the square all of the 365 differences. In this example, the deviation computed for the mode that generates the smooth curve 510 is 7325940.29.

In some embodiments, the deviation computed for a particular model may also be stored along with the parameters. As such, for the model in the above example that uses 16 parameters, the stored values to represent the information may include 17 values, including: {84.57, 126.40, −159.30, 458.96, −212.48, 225.75, −128.59, 154.87, −93.93, 207.49, −183.81, 700.88, −590.73, 519.79, −315.01, 236.19, and 7325940.29}. When providing the parameters to the data analysis module 140, the data compression module 132 may also provide the deviation along with the parameters to the data analysis module 140. The data analysis module 140 may also use the deviation as one of the input for analyzing the information.

In some embodiments, the cardinality determination module 204 may compute multiple deviations for models generated for the information using different cardinalities. For example, the cardinality determination module 204 may generate a model for modeling the information using one parameter, a model for modeling the information using two parameters, a model for modeling the information using three parameters ... a model for modeling the information using n parameters, where n may equal to (or less than) the cardinality of the data points that represent the information. For each of the models generated for the information, the cardinality determination module 204 may compute a deviation of the model from the data points, for example, by computing a sum of the square of all of the deviations from each data point as described above.

In some embodiments, the cardinality determination module may determine, among the cardinalities of the models being generated, a particular cardinality (an optimal cardinality) for modeling the information using an elbow method based on the computed deviations. The elbow method may be used to find an optimal number of parameters (cardinality), such that adding another parameter to the optimal number does not give substantial better modeling of the data (e.g., the reduction of the deviation when adding another parameter does not pass a predetermined threshold).

Furthermore, the process of generating the models using different numbers of parameters can be performed for not only one set of data points, but for many sets of data points associated with the same type of information. For example, the cardinality determination module 204 may obtain multiple sets of data points (e.g., 10 sets, 100 sets, etc.), corresponding to the daily balance of different users, as training sets. The cardinality determination module 204 may generate models using each of the different cardinalities for the different training sets. The deviation computed for each cardinality can then be the sum or the average of the deviations computed for each model using the same cardinality.

Once the optimal cardinality (the number of parameters) is determined for the type of information, that number of parameters will be used for generating models for any information (data points set) of the type. As such, the process 300 then generates (at step 315) a model having the determined number of parameters that represents the obtained information. For example, the modeling engine 206 may generate, for the data points represented by the line 505 in FIG. 5, a B-Spline model having 16 parameters. In addition, a deviation of the generated model from the data points may also be computed. The modeling engine 206 may then generate a record including the 16 parameters and the computed deviation for representing the obtained information (e.g., the daily balance of the user account over the past year). In this example, the record may include: {84.57, 126.40, −159.30, 458.96, −212.48, 225.75, −128.59, 154.87, −93.93, 207.49, −183.81, 700.88, −590.73, 519.79, −315.01, 236.19, and 7325940.29}, where the first sixteen numbers are the sixteen parameters, and the last number is the computed deviation of the model.

In step 320, the process 300 stores the set of parameters. For example, the data compression module 132 may store the record in a database associated with the service provider server 130. In some embodiments, the data compression module 132 may also associate (e.g., tag) the record with data that identifies the information (e.g., the daily balance of a specific user account in the year 2017). Furthermore, in some embodiments, the service provider server 130 may delete the original data points (the 365 data points) associated with the information after storing the record.

In step 325, the process 300 receives a request for analyzing the information obtained in step 305. For example, the data analyzing module 140 may be requested to analyze a transaction request (e.g., a login request, a payment transaction request, a fund withdrawal request, etc.) related to the user account associated with the obtained information to determine whether the transaction request is a fraudulent request. In another example, the data analyzing module 140 may be requested to provide a purchase incentive for the user account associated with the obtained information.

The data analyzing module 140 may then retrieve the record, including the 16 parameters and the deviation, from the database for analysis. In some embodiments, the data analyzing module 140 may use a machine learning algorithm to analyze (at step 330) the information, and may use the 16 parameters and the deviation as the inputs for the machine learning algorithm. The machine learning algorithm may then produce one or more outcomes based on the input.

Figure 6:
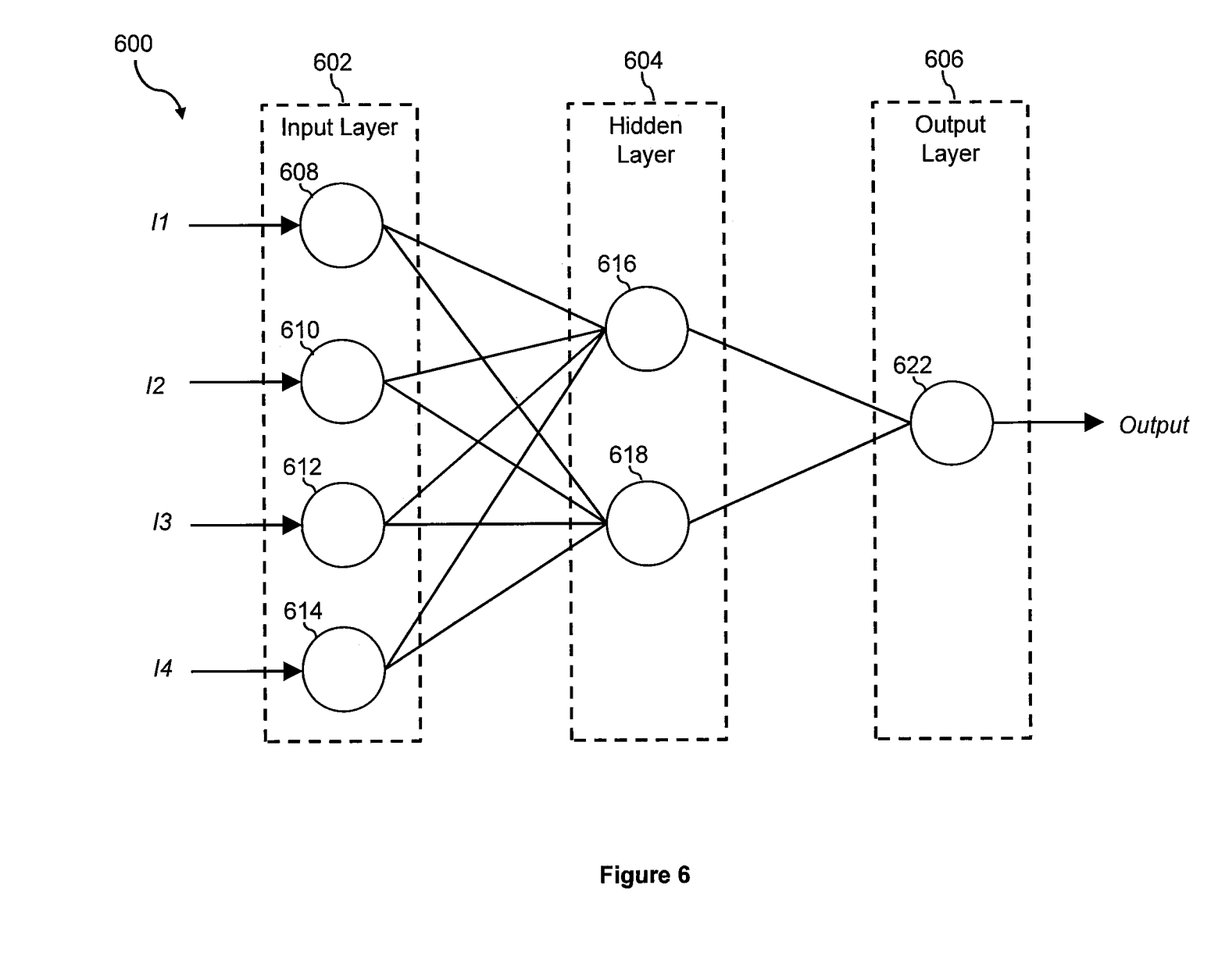
FIG. 6 illustrates an exemplary artificial neural network according to an embodiment of the present disclosure.

FIG. 6 illustrates an example machine learning algorithm 600 implemented as an artificial neural network. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used by the data analysis module 140 may include as many hidden layers as necessary.

In this example, the artificial neural network 600 receives a set of input values and produces an output value. Each node in the input layer 602 may correspond to a distinct input value (e.g., a model parameter or the deviation). For example, the node 608 may correspond to a first parameter of a model, the node 610 may correspond to a second parameter of the model, the node 612 may correspond to a third parameter of the model, and the node 614 may correspond to the deviation computed for the model.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that the nodes 616-618 may produce different values based on the same input values received from the nodes 608-614. The values generated by the nodes 616 and 618 may be used by the nodes 622 in the output layer 606 to produce an output value for the artificial neural network 600.

Once the information is analyzed, the process 335 produces (at step 335) an outcome. For example, the data analysis module 140 may produce an outcome based on the output value of the artificial neural network 600. When the data analysis module 140 is a risk analysis model, the outcome may indicate a likelihood of whether a transaction request is a fraudulent request. On the other hand, when the data analysis module 140 is a marketing campaign analysis module, the outcome may indicate a particular purchase incentive for the user account. In some embodiments, based on the outcome produced by the data analysis module 140, the service provider server 130 may perform an action in response to the request. For example, when the request is a login request, the service provider server 130 may authorize the login request and transmit account information of an account to the user device 110 over the network 160 if the outcome indicates that the request is a legitimate request. On the other hand, the service provider server 130 may deny the login request and transmit account information of an account to the user device 110 over the network 160 if the outcome indicates that the request is a fraudulent request. In another example, when the request is a request for marketing data, the service provider server 130 may generate marketing data (e.g., an incentive, a promotion, etc.) customized for a user based on the outcome produced by the data analysis module 140, and transmits the generated marketing data to the user device 110 over the network 160.

Figure 7:
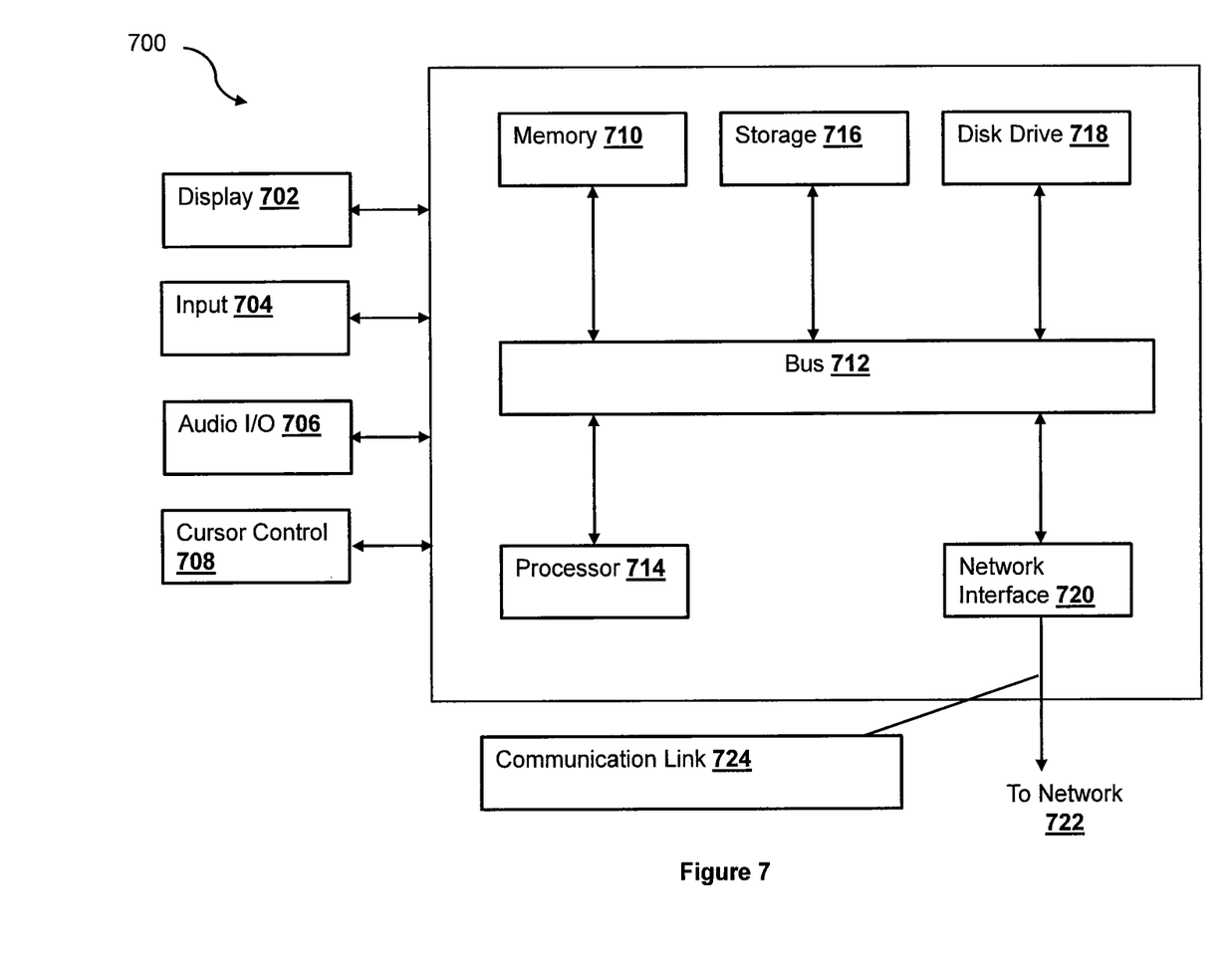
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the risk analysis functionalities described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A method comprising:
receiving, by one or more hardware processors, a request for initiating a machine learning model configured to analyze data over a time dimension;
obtaining, by the one or more hardware processors, first behavior data generated over a first period of time for a first user account associated with a first user, wherein the first behavior data comprises a first plurality of data points having a particular cardinality and representing behavior of the first user over the first period of time;

generating, by the one or more hardware processors, a plurality of models based on the first plurality of data points, wherein each model in the plurality of models is associated with a different set of parameters having a different cardinality that is less than the particular cardinality for representing the first plurality of data points;

determining, for each model in the plurality of models, a deviation between the model and the first plurality of data points;

selecting, from the plurality of models, a first model associated with a first set of parameters having a first cardinality for representing the first plurality of data points based on differences in deviations between the first model and other models in the plurality of models;

configuring the machine learning model to accept input values corresponding to the first set of parameters and a deviation, and to produce an output based on the input values;

training, by the one or more hardware processors, the machine learning model based on the first set of parameters and a first deviation between the first model and the plurality of data points;

receiving, by the one or more hardware processors, a transaction request for processing a transaction for a second user account associated with a second user;

obtaining, by the one or more hardware processors, second behavior data generated over a second period of time for the second user account, wherein the second behavior data comprises a second plurality of data points having the particular cardinality and representing behavior of the second user over the second period of time;

generating, by the one or more hardware processors, a second model based on the second plurality of data points, wherein the second model comprises a second set of parameters having the first cardinality;

determining, by the one or more hardware processors, a second deviation between the second plurality of data points and the second model;

determining, by the one or more hardware processors, a risk associated with the transaction request based on feeding the second set of parameters and the second deviation as input values to the trained machine learning model; and processing, by the one or more hardware processors, the transaction request based on the determined risk.

2. The method of claim 1, further comprising determining a threshold using an elbow method based on the deviations determined for the plurality of models, wherein the first model is selected from the plurality of models based on determining that the differences in deviations exceed the threshold.

3. The method of claim 1, wherein the generated plurality of models comprises at least one of a semi-parametric model or a non-parametric model.

4. The method of claim 1, wherein the first behavior data represents electronic transactions associated with the first user account conducted over the first period of time.

5. The method of claim 4, wherein the electronic transactions comprises at least one of a login transaction, an electronic payment transaction, or a fund withdrawal transaction.

6. The method of claim 1, wherein the first behavior data represents an account balance of the first user account over the first period of time.

7. The method of claim 1, wherein the first behavior data comprises web browsing behavior of the first user.

8. The method of claim 1, further comprising:
determining whether the transaction request is a fraudulent request based on an output value from the trained machine learning model; and
in response to determining that the transaction request is not a fraudulent request, authorizing a transaction associated with the transaction request.

9. The method of claim 1, wherein the machine learning model is trained to produce a likelihood of whether the transaction request is a fraudulent request based on the second set of parameters and the second deviation.

10. A system comprising:
a non-transitory memory; and
one or more hardware processors coupled to the non-transitory memory and configured to read instructions from the non-transitory memory to cause the system to perform operations comprising:
accessing a machine learning model configured to analyze data associated with a dimension;
obtaining first information along the dimension, wherein the first information comprises a first plurality of data points along the dimension and having a first cardinality;
accessing a plurality of models that model the first plurality of data points, wherein each model in the plurality of models is associated with a different set of parameters having a different cardinality that is less than the first cardinality;
computing, for each model in the plurality of models, a deviation between the model and the plurality of data points;
determining, for each model in one or more of the plurality of models, an improvement index representing differences in deviations with respect to a predecessor model a successor model, respectively;
selecting, from the plurality of models, a first model based on the improvement indices determined for the one or more of the plurality of models, wherein the first model is associated with a first set of parameters having a second cardinality for representing the first plurality of data points;
configuring the machine learning model to accept input values corresponding to the first set of parameters and a deviation, and to produce an output based on the input values;
training the machine learning model based on the first set of parameters and a first deviation between the first model and the first plurality of data points;
receiving a transaction request for processing a transaction for a second user account associated with a second user;
obtaining a second plurality of data points associated with the second user account, wherein the second plurality of data points has the first cardinality;
generating a second model based on the second plurality of data points, wherein the second model comprises a second set of parameters having the second cardinality for representing the second plurality of data points;
determining a second deviation between the second plurality of data points and the second model;

generating an output value associated with the transaction request based on feeding the second set of parameters and the second deviation as input values to the trained machine learning model; and processing the transaction request based on the output value.

11. The system of claim 10, wherein the dimension is one of a time dimension or a geographical location dimension.

12. The system of claim 11, wherein the dimension is the geographical location dimension, and the first plurality of data points represent a number of times the first user has visited corresponding locations along the geographical location dimension.

13. The system of claim 10, wherein the generated plurality of models comprises at least one of a semi-parametric model or a non-parametric model.

14. The system of claim 10, wherein the transaction request is related to a pending transaction, and wherein the machine learning model is trained to produce a likelihood that the pending transaction is associated with a fraudulent transaction based on the second set of parameters and the second deviation.

15. A non-transitory machine-readable medium having stored thereon machine-readable instructions executable to cause a machine to perform operations comprising:

obtaining first customer behavior data generated over a first period of time, wherein the first customer behavior data comprises a first plurality of data points having a first cardinality and representing behavior of a first user over the first period of time;

generating a plurality of models that represent the first plurality of data points, wherein each model in the plurality of models is associated with a different set of parameters having a different cardinality that is less than the first cardinality;

determining, for each model in the plurality of models, a deviation between the model and the plurality of data points;

determining an arrangement of the plurality of models according to the cardinalities of the plurality of models;

determining, for each model in at least a subset of the plurality of models, an improvement index representing differences in deviations with respect to a predecessor of the model and a successor of the model according to the arrangement;

selecting, from the plurality of models, a first model based on the improvement indices determined for the at least the subset of the plurality of models, wherein the first model is associated with a first set of parameters having a second cardinality for representing the first plurality of data points;

configuring the machine learning model to accept input values corresponding to the first set of parameters and a deviation, and to produce an output based on the input values;

training the machine learning model based on the first set of parameters and a first deviation between the first model and the plurality of data points;

receiving a transaction request for processing a transaction for a second user account associated with a second user;

obtaining a second plurality of data points associated with the second user account, wherein the second plurality of data points has the first cardinality;

generating a second model based on the second plurality of data points, wherein the second model comprises a second set of parameters having the second cardinality for representing the second plurality of data points;

determining a second deviation between the second plurality of data points and the second model;

generating an output value associated with the transaction request based on feeding the second set of parameters and the second deviation as input values to the trained machine learning model; and processing the transaction request based on the output value.

16. The non-transitory machine-readable medium of claim 15, wherein the operations further comprise:

determining whether the transaction request is a fraudulent request based on the output value; and in response to determining that the transaction request is not a fraudulent request, authorizing a transaction associated with the transaction request.

17. The non-transitory machine-readable medium of claim 16, wherein the machine learning model is trained to produce a likelihood of whether transaction request is a fraudulent request based on the second set of parameters and the second deviation.

18. The non-transitory machine-readable medium of claim 15, wherein the transaction request is associated with at least one of a login transaction, an electronic payment transaction, or a fund withdrawal transaction.

19. The non-transitory machine-readable medium of claim 15, wherein the first customer behavior data represents an account balance of the first user account over the first period of time.

20. The system of claim 10, wherein the operations further comprise:

determining whether the transaction request is a fraudulent request based on the output value from the trained machine learning model; and in response to determining that the transaction request is a fraudulent request, denying a transaction associated with the transaction request.

* * * * *